(12) United States Patent
Carter et al.

(10) Patent No.: US 7,161,902 B2
(45) Date of Patent: Jan. 9, 2007

(54) REDUCING NETWORK TRAFFIC CONGESTION

(75) Inventors: Malcolm Carter, Bishops Stortford (GB); David Ireland, Chelmsford (GB); Kevin Warbrick, Bishops Stortford (GB); Jon Weil, Trumpington (GB); Peter Hamer, Bishops Stortford (GB); Richard Clegg, Heslington (GB); Arthur Clune, York (GB)

(73) Assignee: Nortel Networks Limited, St. Laurent (CA)

( * ) Notice: Subject to any disclaimer, the term of this patent is extended or adjusted under 35 U.S.C. 154(b) by 984 days.

(21) Appl. No.: 10/156,428

(22) Filed: May 28, 2002

(65) Prior Publication Data

US 2003/0035374 A1 Feb. 20, 2003

Related U.S. Application Data

(60) Provisional application No. 60/310,955, filed on Aug. 8, 2001.

(51) Int. Cl.
*H04J 1/16* (2006.01)

(52) U.S. Cl. ..................... 370/229; 370/235

(58) Field of Classification Search ............... 370/229, 370/230, 230.1, 231, 235, 237, 238, 248, 370/252, 253, 389, 395.4, 400, 401
See application file for complete search history.

(56) References Cited

U.S. PATENT DOCUMENTS

| 5,377,327 | A | * | 12/1994 | Jain et al. ................... 709/235 |
| 5,541,852 | A | * | 7/1996 | Eyuboglu et al. ........... 709/232 |
| 5,970,443 | A | * | 10/1999 | Fujii .......................... 704/222 |
| 6,069,872 | A | * | 5/2000 | Bonomi et al. ............. 370/236 |
| 6,141,323 | A | * | 10/2000 | Rusu et al. .................. 370/236 |
| 6,985,443 | B1 | * | 1/2006 | Hansen ....................... 370/237 |

* cited by examiner

*Primary Examiner*—Brenda Pham
(74) *Attorney, Agent, or Firm*—Barnes & Thornburg LLP

(57) ABSTRACT

Congestion control in a communications network, e.g. an Internet Protocol (IP) network, is effected by controlling the egress rate of traffic from the output buffer of the system routers or switches. The traffic egressing from an output buffer is sampled at sequential intervals to determine a bit rate at each interval. An autocorrelation function is calculated from these samples and is used to provide an estimated statistical measure or parameter indicative of congestion and related to a long range dependence of the traffic. A calculation is then made as to whether an increase or a decrease in the buffer output rate would result in a decrease in the congestion parameter, and the buffer output rate is adjusted accordingly.

22 Claims, 10 Drawing Sheets

REDUCING NETWORK TRAFFIC CONGESTION

Related Application

This application is the non-provisional filing of provisional U.S. patent application Ser. No. 60/310,955, filed Aug. 8, 2001.

FIELD OF THE INVENTION

This invention relates to methods and arrangements for reducing the effects of congestion in a communications network.

BACKGROUND OF THE INVENTION

A major development in the communications field has been the introduction of Internet Protocol (IP) networks in which packet traffic is routed at a number of network nodes in order to reach its destination.

The technique has the advantage of low cost and the ability to carry a wide range of traffic types and services. A particular problem that has resulted from the introduction of IP networks has been the explosive growth of traffic which has led to congestion. A feature of this IP traffic is that it is inherently 'bursty' in nature, i.e. there are rapid variations in bit rate. During the traffic flow peaks, congestion can occur and this in turn has led to packet loss and consequent delays in transmission. For best effort data services, packet loss results in a delay in data transfer which, while not critical to the user, is perceived as a reduction in the capacity of service that is provided. For time critical services, such as voice, the loss of packets can have a deleterious effect on the transmission quality resulting in failure to meet the high quality of service criteria that are demanded from such services.

A particular problem with telecommunications traffic is that it has been found to exhibit an inherently 'bursty' nature rather than purely random statistical properties. As a consequence, the traffic that is being transported tends to retain its inherent 'bursty' nature even when a number of such traffic streams are aggregated on to a common path. This feature of communications traffic is attributed to long range dependence (LRD) which is a statistical phenomenon related to chaos theory and which, loosely speaking, is associated with time series which are correlated over a number of time-scales. It has long been known that LRD is found in network traffic and causes degradation in network performance. Because LRD traffic is more "bursty" than a typical Poisson distribution model previously used to model telecommunications networks, packet loss is more likely with an LRD traffic stream of the same overall volume. The level of long range dependence (LRD) in a time series is characterised by the Hurst parameter 'H' where, 0<H<1. A value of H=0.5 is characteristic of data with no long range dependence, and 0.5<H<1 implies that long range dependence is present, (0<H<0.5 implies anti-long range dependence in which a time series has negative correlation over a number of time scales).

Descriptions of the long-range dependence of communications packet traffic are provided in the following reference documents:

V. Paxson et al 'Wide Area Traffic: the failure of Poisson Modelling', IEEE Transaction on Networks, Vol.3, No.3, June 1995, pp226–244.

W. E. Leland et al., 'On the Self Similar Notice of Ethernet Traffic', IEEE/ACM Transactions on Networking, Vol.2, No.1, February 1994, pp 1–15.

B. K Ryu et al, 'The importance of Long-Range Dependence of VBR Video Traffic in ATM Traffic Engineering', Computer Communication Review, Vol. 26, pp 3–14, October 1996.

The current approach to the problem of the bursty nature and the long range dependence of communications traffic is to over-provision the network switches and routers with buffers to cope with the burstiness of the traffic, i.e. buffers of sufficient capacity to handle traffic flow peaks, and/or to allow the over capacity traffic to be dropped whenever a buffer becomes filled to capacity. Both approaches are less than satisfactory, the first on cost and complexity grounds and the second on the grounds of potential reduction of quality of service. Further, as buffer sizes increase, there is a corresponding increase in the delay in processing the traffic. This can be a significant factor when handling delay sensitive traffic such as voice.

In an attempt to address the congestion problem and to carry greater volumes of traffic more efficiently, networks are being introduced comprising an edge network providing access to an optical core. Within the optical core, traffic is carried between nodes on optical fibre paths which provide a large bandwidth capability for handling significant volumes of traffic. Within the core, routers are relatively simple and perform a rapid switching function. While this technique has the potential to greatly increase the capacity and speed of communications networks, it has introduced the problem of packet queuing at routers within the optical core thus detracting from the high speed nature of the core routers. Further, there is considerable motivation towards the goal of optical packet switching, and this will require the avoidance of packet queuing at core routers. For this reason, many workers have been developing techniques for controlling traffic in the edge network so that traffic is routed into the core only if sufficient resources are available within the core to handle that traffic. Where congestion is occurring in the edge network, this can then lead to the rejection of requests for service, a reduction in the quality of service perceived by the customer, and a potential loss of revenue to the network operator.

In order to reduce the effects of congestion and thus handle a greater volume of traffic, various workers have proposed controlled scheduling of the traffic queues in a manner that smoothes the peaks on bursts of traffic so that the core network can then process a more uniform traffic flow. However, in order to achieve this controlled scheduling in an optimum manner, knowledge of the statistical properties of the traffic flow is required. As discussed above, it has been found that packet traffic in a network does not have a smooth random pattern but instead displays a long range dependency. It is necessary to have a measure of this long range dependency before an efficient process of queue scheduling and traffic congestion can be determined. It will also be understood that this long-range dependency is not constant but varies with changes in the traffic mix and content.

As discussed above, it is generally accepted that the degree or magnitude of long-range dependence of communications packet traffic is characterised by the statistical measure known as the Hurst parameter. In theory, a knowledge of the Hurst parameter would then permit appropriate scheduling and aggregation of traffic to provide a substantially uniform flow in the core network. However, calculation of the Hurst parameter is a complex operation requiring significant computer power. It is impractical to perform this calculation at a reasonable cost and with sufficient rapidity to provide real time information for the processing of communication traffic.

SUMMARY OF THE INVENTION

An object of the invention is to minimize or to overcome this disadvantage.

According to a first aspect of the invention there is provided a method of grooming communications traffic output under the control of a scheduler from a switch or router so as to effect congestion control, the method comprising; sampling the output traffic to determine a bit rate at each sample, estimating from the traffic samples a statistical measure indicative of congestion and related to a long range dependence of the traffic, determining whether an increase or decrease in the scheduler dispatch rate would result in an increase or decrease in the estimated statistical measure, and adjusting the scheduler dispatch rate so as to reduce the estimated statistical measure.

According to another aspect of the invention there is provided a method of controlling egress of traffic from an output buffer of a communications device so as to effect congestion control, the method comprising; sampling the traffic output from the buffer at sequential intervals to determine a bit rate at each interval; estimating from a plurality of successive traffic samples a statistical measure indicative of congestion and related to a long range dependence of the traffic; and increasing or decreasing the rate at which the traffic is output from the buffer so as to reduce said statistical measure and thereby reduce said congestion.

According to a another of the invention there is provided a method of aggregating traffic from a plurality or traffic streams in a communications packet network, the method comprising;

queuing the traffic streams in respective buffer stores;

selecting queued packets from the stores via a scheduler for dispatch on a common path;

dispatching the selected packets at a controlled rate from the scheduler on to a path so as to form an aggregate traffic stream on that path;

sampling the aggregate traffic streams and estimating from the traffic stream samples a statistical measure indicative of congestion and related to a long range dependence of the traffic over a plurality of successive samples; and adjusting the dispatch rate of the scheduler so as to reduce the estimated statistical measure to a minimum value.

According to another aspect of the invention there is provided a method of controlling egress of traffic from an output buffer of a communications device so as to reduce downstream congestion, the method comprising; sampling the traffic output from the buffer at sequential intervals to determine a bit rate at each interval; calculating from successive samples an estimated autocorrelation function for the egressing traffic estimating from said estimated autocorrelation function a statistical measure related to a long range dependence of the traffic; determining whether an increase or decrease in the rate at which the traffic is output from the buffer will reduce said estimated statistical measure; and, responsive to said determination, increasing or decreasing said output rate.

According to another aspect of the invention there is provided method of aggregating traffic from a plurality or traffic streams in a communications packet network, the method comprising; queuing the traffic streams in respective buffer stores; selecting queued packets from the stores via a scheduler for dispatch on a common path; dispatching the selected packets at a controlled rate from the scheduler on to a path so as to form an aggregate traffic stream on that path; sampling the aggregate traffic streams and estimating from the traffic stream samples a statistical measure indicative of congestion and related to a long range dependence of the traffic over a small number of successive samples; and adjusting the dispatch rate of the scheduler so as to reduce the estimated statistical measure to a minimum value.

According to another aspect of the invention there is provided a method of determining a statistical measure indicative of congestion and related to a long range dependency of a communication packet stream, the method comprising sampling the packet stream, and estimating from the traffic stream samples a normalised measure of the auto correlation of the traffic stream over a small number of successive samples, and determining the statistical measure as a ratio of autocorrelation functions determined over first and second time periods.

According to another aspect of the invention there is provided a method of controlling the egress rate of traffic from an output buffer in a communications network so as to effect congestion control downstream of the buffer, the method comprising; sampling the egressing traffic at sequential intervals to determine a bit rate at each interval, estimating from the traffic samples a statistical measure indicative of congestion and related to a long range dependence of the egressing traffic, determining whether an increase or decrease in the buffer output rate would result in an increase or decrease in the estimated statistical measure, and adjusting the buffer output rate so as to effect a decrease in the estimated statistical measure.

The method provides an estimated statistical measure that is related to the long range dependence (the Hurst measure) which, while not necessarily the true analytic value of that parameter, is a sufficiently close approximation for the purposes of communications traffic congestion control. Advantageously, the estimated measure is determined from a calculation of an autocorrelation function for a series of traffic samples.

The estimation process is further simplified by calculating the parameter only over the time scale of interest to the communications network. Thus, very short term variations are discounted as the system buffers are not responsive to such variations. Also, long term variations are discounted as these arise from factors other than the burstiness of the traffic and can be addressed by an appropriate call admission control policy. Advantageously, estimation of the long range dependence over time scales of 100 microseconds to one second provides sufficient information for the purposes of communications traffic grooming. The estimated parameter corresponding to the long range dependence will be referred to below as a statistical measure or K value.

The method has the effect of reducing the "burstiness" of traffic output from a router or switch thus reducing the downstream buffering requirement. A knowledge of the estimated statistical parameter provides an indication of the action required to reduce congestion. This is of particular advantage in the optical core of a network where there is a need for simplicity of router construction in order to take full advantage of the high speed capability of optical transmission.

In a preferred embodiment, the congestion parameter estimate is determined from a ratio of autocorrelation functions for first and second time periods, this ratio providing a measure of the decay of the autocorrelation function.

Advantageously, the method is embodied as software in machine readable form on a storage medium.

According to another aspect of the invention there is provided a communications network router having means for controlling egress of traffic from an output buffer, the router comprising; sampling means for sampling the traffic output from the buffer to determine a bit rate at each sample; means for estimating from a plurality of successive traffic samples a statistical measure indicative of congestion and related to a long range dependence of the traffic; and control means for increasing or decreasing the rate at which the traffic is output from the buffer so as to reduce said statistical measure and thereby reduce said congestion.

According to another aspect of the invention there is provided a communications network comprising a plurality of routers interconnected by communications links, each said router having scheduler means for controlling the rate at which traffic is output from the switch or router, and wherein at least some of said routers are provided with sampling means for sampling the output traffic from that router to determine a bit rate at each sample, estimating means for determining from the traffic samples a statistical measure indicative of congestion and related to a long range dependence of the traffic, and means for adjusting the scheduler dispatch rate so as to minimise the statistical measure and thereby reduce said congestion.

According to another aspect of the invention there is provided a communications network comprising; a first set of routers constituting an edge network, and a second plurality of routers constituting a core network, wherein each edge network router has scheduler means for controlling the rate at which traffic is output from the switch or router, and wherein each said edge router is provided with sampling means for sampling the output traffic from that router at sequential intervals to determine a bit rate at each interval, estimating means for determining from the traffic samples a statistical measure indicative of congestion and related to a long range dependence of the traffic, and means for adjusting the scheduler dispatch rate of that router so as to minimise the estimated statistical measure and thereby reduce downstream congestion of traffic output from that edge router to another edge router or to a core router.

In a preferred embodiment, congestion control in a communications network, e.g. an Internet Protocol (IP) network, is effected by controlling the egress rate of traffic from the output buffer of the system routers or switches. The traffic egressing from an output buffer is sampled at sequential intervals to determine a bit rate at each interval. An autocorrelation function is calculated from these samples and is used to provide an estimated statistical measure or parameter indicative of congestion and related to a long range dependence of the traffic. A calculation is then made as to whether an increase or a decrease in the buffer output rate would result in a decrease in the congestion parameter, and the buffer output rate is adjusted accordingly.

We have found that a small number of successive samples provide sufficient information to determine an approximate or estimated measure of the long range dependency of traffic for the medium term variations that are of interest in the communications field. Typically, three or four samples are sufficient to provide an approximation of sufficient accuracy within the range of interest for this purpose.

In a network, the output of each router may be controlled so as to reduce downstream congestion of the traffic. This reduces the downstream buffering requirements throughout the network.

The control of traffic may further be employed at an egress of a first network where the traffic is forwarded to another network or domain.

BRIEF DESCRIPTION OF THE DRAWINGS

An embodiment of the invention will now be combined with reference to the accompanying drawings in which.

DESCRIPTION OF PREFERRED EMBODIMENTS

Figure 1:
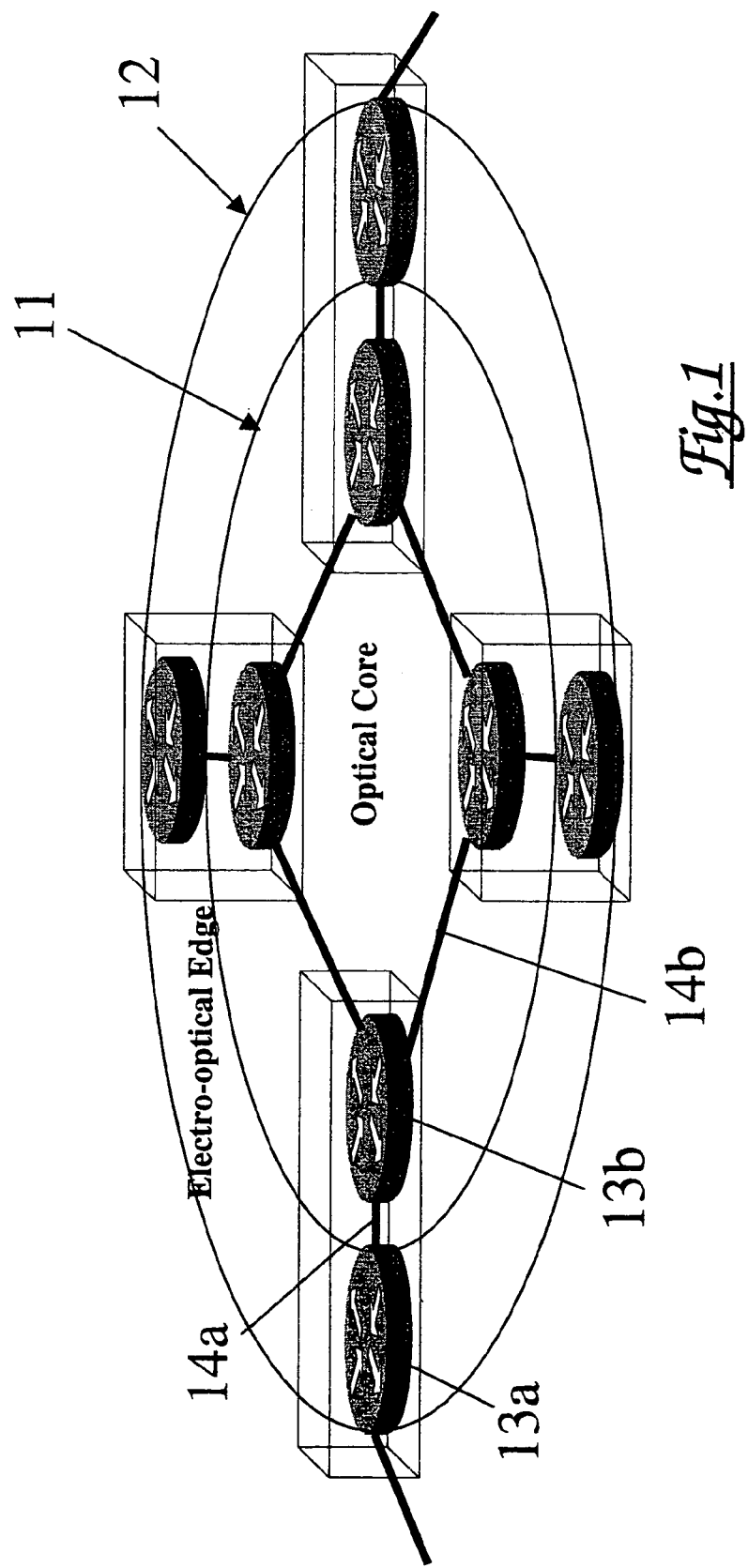
FIG. 1 is a schematic diagram of a communications packet network.

Referring first to FIG. 1, this shows in highly schematic form the construction of an exemplary packet communications network comprising a core network 11 and an access or edge network 12. Both the core and edge network are each constituted by a plurality of nodes or routers 13$a$, 13$b$ interconnected by connections links 14$a$, 14$b$ typically, the core network transports traffic in an optical domain, and the core links 14$b$ comprise optical fibre paths. Advantageously, routing decisions in the network of FIG. 1 are made at the network edge 12 so that, when a packet is despatched into the core network, a route has been defined and resources have been provisionally reserved.

It will be understood that the network of FIG. 1 will typically comprise a multilayer structure in which an underlying optical transport layer serves an IP (Internet protocol) layer constituted by the routers. The network may include one or more further layers, e.g. an MPLS (multiprotocol label switched) layer. However, in the interests of clarity only the IP layer of the network is depicted in FIG. 1.

Within the network of FIG. 1, each packet is provided at the network edge with a header containing information relating to the packet destination, a preferred route for the packet and an indication of the priority or quality of service (QoS) class of the packet. Packets arriving at a router are routed to appropriate router output ports in accordance with the information contained in the packet locations. At the output port, the packets are queued in one or more output buffers from which packets are selected by a scheduler for dispatch over a outgoing link to the next router.

Figure 2:
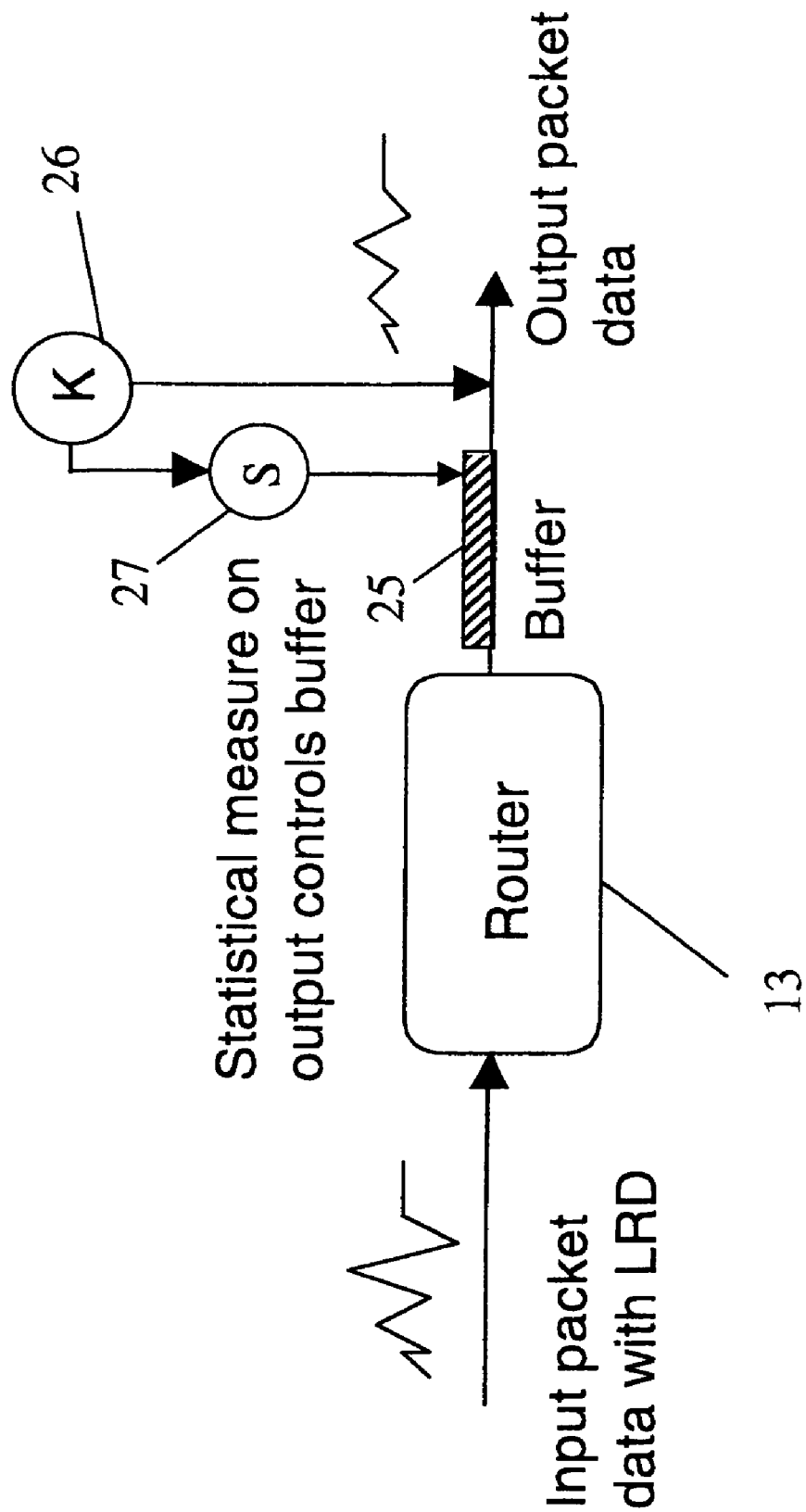
FIG. 2 illustrates the process of long range dependence control at a router.

FIG. 2 illustrates the concept of control and reduction of long range dependence of traffic. This diagram shows the simplest type of traffic grooming ("dekippling") arrangement where the statistical measure on the output of a buffer 25 is used to control whether or not the buffer can send packets. The traffic exiting from the buffer is sampled at regular intervals to determine the bit rate at each sampling interval. Sets of consecutive samples are processed by processor 26, as will be described below, to provide a statistical measure related to the medium term long range dependence of the traffic, this measure being expressed as a value K A calculation is then performed to determine whether an increase or a decrease in the dispatch rate of the output buffer will reduce the value of K. The result of this determination is used to control the buffer output rate via a scheduler 27 associated with the buffer. Note that the process operates on both fixed and variable length packet traffic as the sampling measures bytes per unit time rather than the number of packets.

The communications traffic at a router output can be considered as a time series x(t) displaying autocorrelation properties. One way of explaining long range dependence is in terms of the auto-correlation function (ACF). The auto-correlation function is a measure of how similar a time series x(t) is to itself shifted in time by k creating the new series x(t+k) The magnitude of the long range dependence is related to the decay rate of the autocorrelation function.

If we have a time series x(t) the auto-correlation function A(k) for that time series is given by:

$$\int_0^\infty x(t)x(t+k)dt$$

where k represents the displacement in time of the series with respect to itself.

An independent process exhibits an auto-correlation function (ACF) which decays exponentially fast as k increases. That is:

$A(k) \sim a^{|k|}$ as $|k| \to \infty$, $0 < a < 1$ (where ~ is used to mean "asymptotically proportional to"). To put it in less mathematical terms, the time series does not correlate well with a time shifted version of itself.

In a long range dependant process however, as exhibited by communications traffic, the auto-correlation function does not decay exponentially fast but instead has the form:

$A(k) \sim |k|^{-\beta}$, as $|k| \to \infty$, $0 < \beta < 1$.

The parameter $\beta$ is related to the Hurst Parameter which, as discussed above is a frequently used measure of the degree of long range dependence, although an exact calculation of $\beta$, and thus the Hurst parameter, is a complex and time consuming process that is ill suited to telecommunications applications where decisions regarding the handling of traffic must be made with rapidity and in real time.

The Hurst Parameter can be derived from $\beta$ in the above equation from the relation:

$H = 1 - \beta/2$

We can therefore think of long range dependence as representing a high autocorrelation over a variety of time scales. However we have found that, in the communications field, some scales of correlation are more important than others. In particular, we have appreciated that correlations of a much shorter time scale than the buffer drain time can be ignored as these will have an insignificant effect. We have also discovered that longer time scales may be safe to ignore since:

i) In real traces, correlations are typically low over longer time scales (until we get to the day scale—traces are correlated on this scale but this is unlikely to affect buffer overflow probability (BOP).
ii) It is impractical to hold up traffic for long enough to significantly affect the autocorrelation function over longer time scales since this would require significant latency in the system and be uneconomic or wasteful in resources.

Accordingly, we have found that determination of the autocorrelation function over time scales of about 100 microseconds to about one second provides sufficient information for the purposes of communications traffic grooming. The particular time scale chosen will depend on link speed, i.e. higher link speeds require a shorter time scale for the autocorrelation function.

Having established the time scales of interest, it is then necessary to find the best measure of burstiness over these time scales. This is the statistical parameter K. Our preferred method is to use a measure related to the auto-correlation function. Recall that LRD can be thought of as being related to a slowly decaying auto-correlation function. Therefore, if we want to reduce the effects of LRD, then we wish to reduce the auto-correlation function for high values of k. If we measure the total number of bytes/unit time past a point, then we can create a time series of T points:

$X_T = (x_1, x_2, \ldots x_T) x_n \in N \forall n$ and we can then calculate the discrete auto-correlation function A(k) for a delay k:

$$A(k) = \sum_{n=1}^{T-k} x_n x_{n+k}$$

If a new point arrives then we can set a new time series:

$X'_T = (x_2, \ldots x_{T+1})$ $x_n \in N \forall n$ and the auto-correlation function for the new time series is given by:

$A'(k) = A(k) - x_1 x_{1+k} + x_{T+1} x_{T+1-k}$

If we want to choose a value of $x_{T+1}$ to minimise A'(k) then we would choose $x_{T+1} = 0$ every time. This problem is avoided by using the normalised auto-correlation function:

$$A_n(k) = \sum_{n=1}^{T-k} \frac{(x_n - \bar{x})(x_{n+k} - \bar{x})}{\sigma}$$

where $\sigma$ is the sample variance. It should be noted that this expression is not defined when the variance is 0, and the upper and lower parts of the sum are both zero. This is not a problem as A(k) can be set to zero for this special case. Alternatively, since the Hurst parameter is related to the decay of the autocorrelation function, then we could normalise by using a smaller value of k. In a preferred embodiment, we define the statistical parameter K on the basis of the autocorrelation function measures, e.g. as a ratio of successive autocorrelation function measures, i.e. as:

$$K = \frac{A(k_1)}{A(k_2)}$$

where $k_1 > k_2$.

For the purposes of estimating the K parameter for communications traffic, we have found that sampling intervals in the range about ten microseconds to about one millisecond provide an effective result in real time and with only a small computational demand. The optimum sampling rate will depend on the average bit rate of the system.

Using the above technique, we determine a value of K at the output of a router or switch into a buffer, and then calculate what the value of K would be if the traffic level output from that buffer were high, medium or low. Using this information and knowledge of the current buffer occupancy we then decide whether to let traffic leave the buffer at full speed, to slow down traffic from the buffer or even to stop it entirely for a short period. In other words, where our local buffer has temporary capacity to spare, we might choose to hold up outflow from the buffer slightly in order to better 'groom' traffic for buffers which it will encounter downstream. In practice, the process is performed automatically under the control of software.

Figure 3:
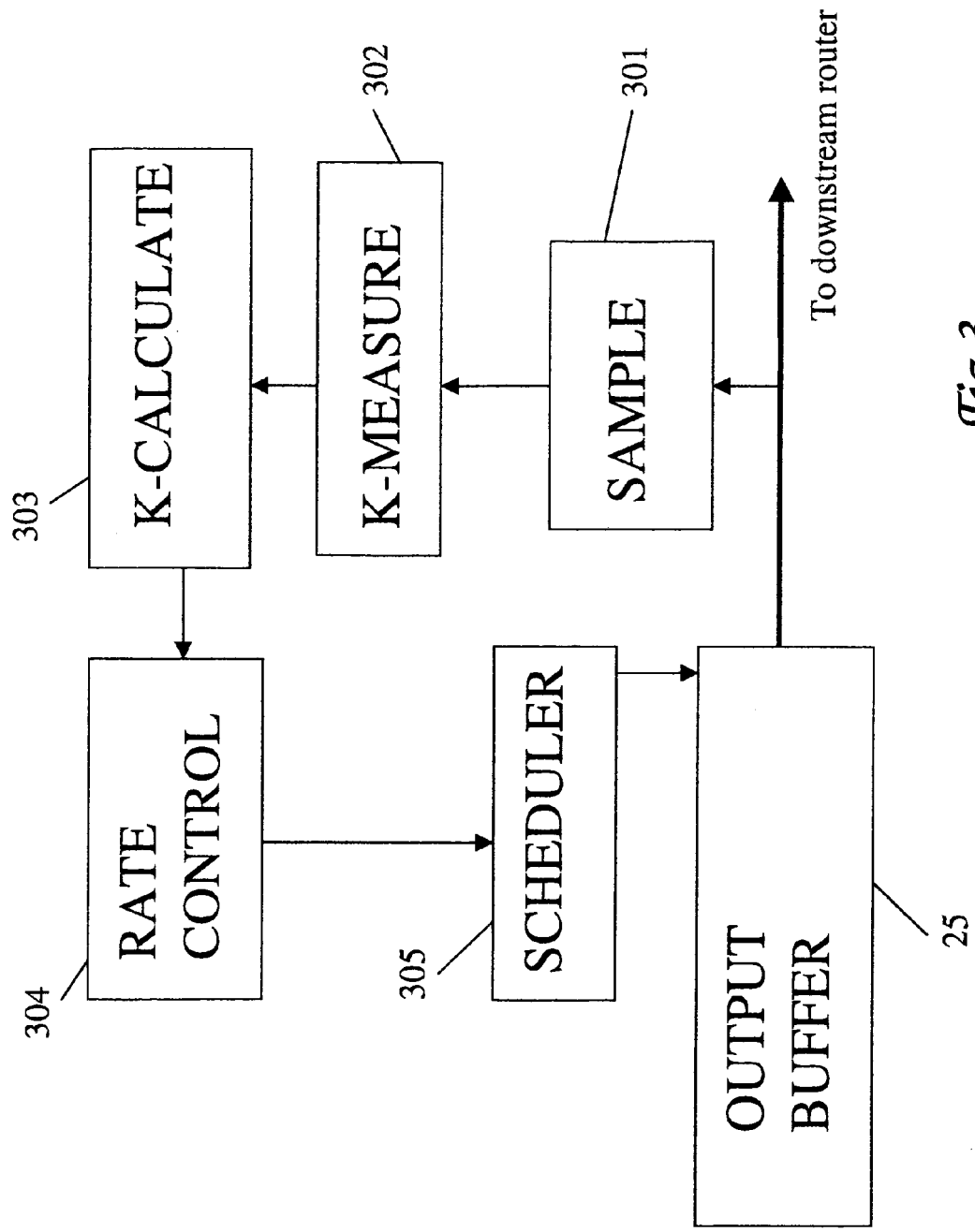
FIG. 3 illustrates the traffic sampling and buffer control process at a router output buffer.

Referring now to FIG. 3, this illustrates a preferred arrangement for the control of traffic at an output buffer of a router. The traffic on the output link from the output buffer 25 is sampled by sampling circuit 301. This circuit measures bit rate at regular present intervals. Successive sets of three or four of these sample measurement are used by K-measurement circuit 302 to determine the current decay of the auto-correlation function and hence the K parameter value of the output traffic. A mathematical model is employed by K-calculation circuit 303 which determines the effect that an increase or decrease in the buffer output sent would have on the value of K, i.e. whether an increase or decrease in the buffer output auto is required to reduce the value of K A lower value of K represents a reduction in the burstiness of the traffic being output from the buffer. This information is then fed back to the scheduler 305 via route control circuit 304 to achieve the described change of output rate.

It will be appreciated that, although the K-measurement, K-calculation and rate control circuits have been depicted as discrete components in FIG. 3, they may be incorporated in the form of software within a network manager controlling the network so as to provide a distributed control system.

Figure 4:
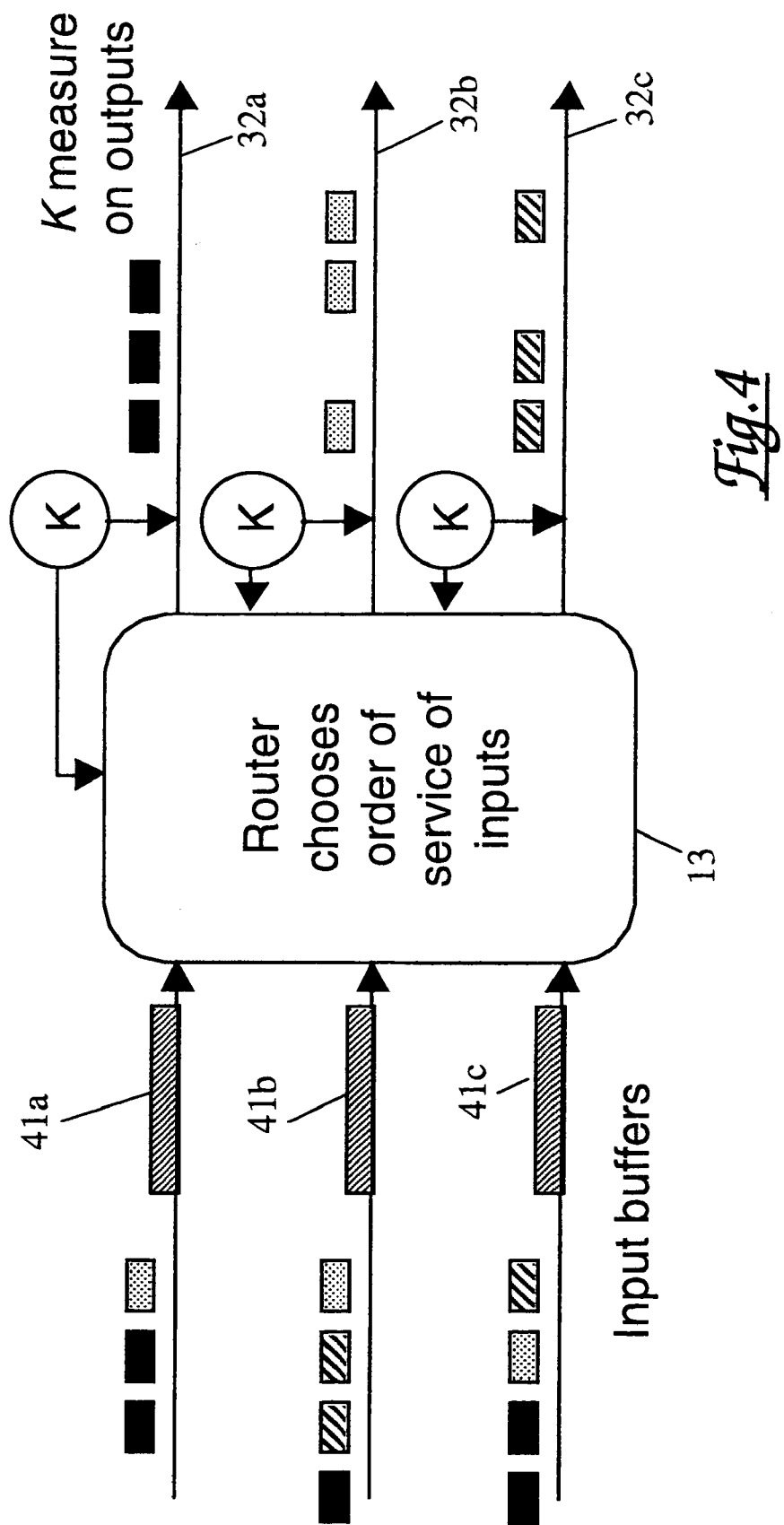
FIG. 4 illustrates a method of control of a switch or router having a plurality of input buffers.

FIG. 4 shows a development of the technique for use in a switch or router with significant input buffering where the router chooses in which order input buffers 51a, 51b, 51c are to be serviced. For explanatory purposes, the queued packets in the input buffers are marked according to the particular output buffer to which they will be directed. Thus, 'black' packets 55a will be routed to output buffer 52a, 'shaded' packets 55b to output buffer 52b, and 'striped' packets 55c to output buffer 52c. In this embodiment, the switch or router 13 measures the K parameter on each of its three outputs 52a, 52b, 52c. It may be, for example, that, the third output 52c (striped packets) requires more traffic to reduce the 'burstiness' of the traffic. If this is the case and it is known that for example the second input buffer 51b has previously had more traffic which is headed for the third output (the queue in the second input shows more striped packets than other queues), then the router may choose to preferentially service the second input buffer. In this way, the router selects traffic from the input buffers in a manner which provides a reduced long range dependence of the output traffic.

In a further embodiment, the burstiness of traffic is measured on the input buffer where calls are being admitted to a network. The burstiness of the traffic could be taken into account when deciding whether or not to admit the call.

Figure 5:
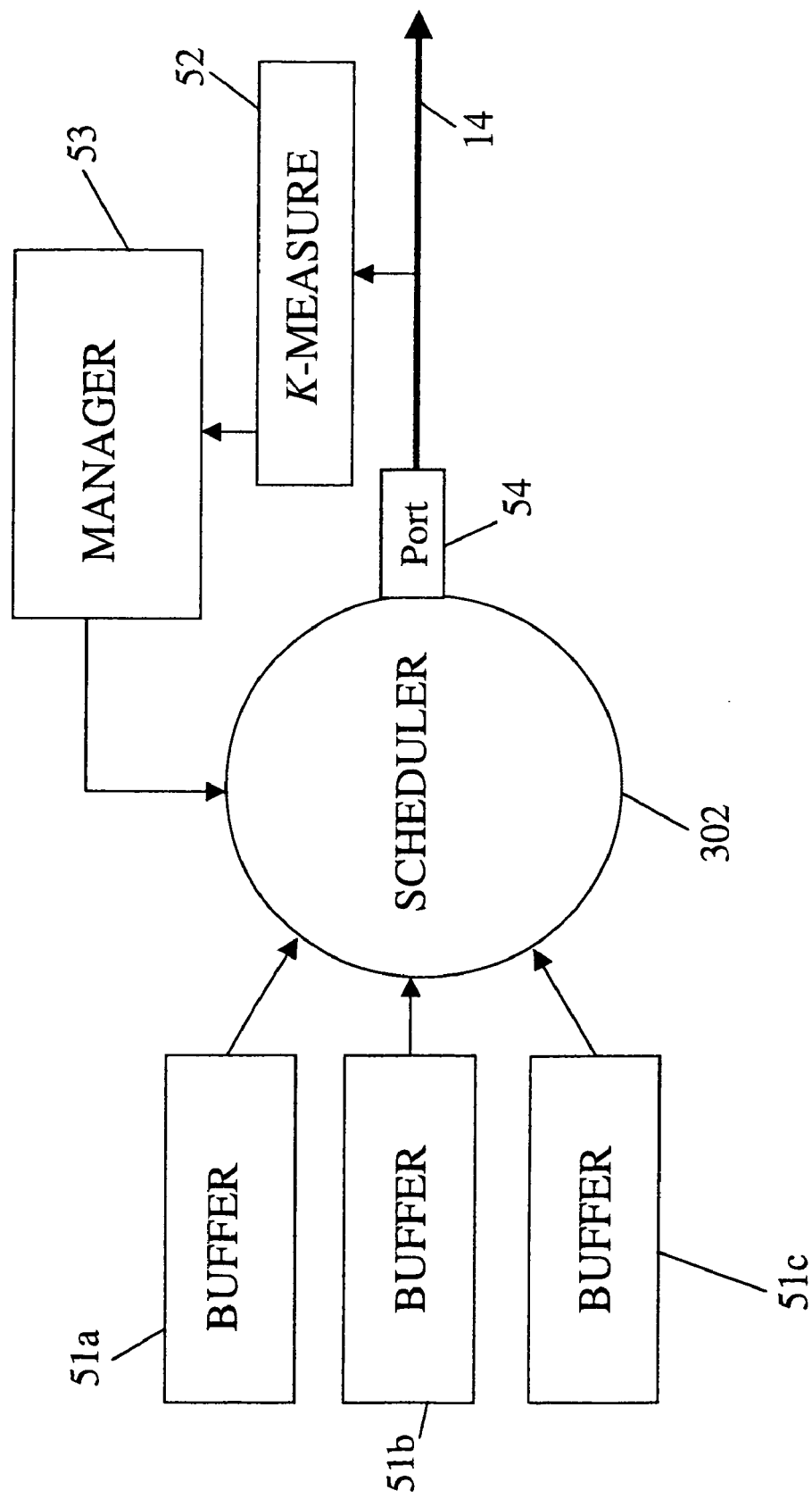
FIG. 5 illustrates a method of control of a switch or router having a plurality of output buffers.

FIG. 5 shows an exemplary output port construction of a router having a number of output buffers. Packet traffic for the output port 54 is stored in first-in-first-out (FIFO) buffers 21c, 21b, 21c. Typically, the traffic will be segregated according to the class of service or by the ingress port (not shown) from which the traffic was received. Although three buffers are shown in FIG. 5, it will be appreciated that the number of buffers will be chosen according to the number of service classes envisaged and the volume of traffic which the router is designed to handle. Queued packets are taken from the individual buffers by a scheduler 302. The scheduler 302 determines which queued packet to send on outgoing link 14 and when to send that packet.

A measure of the long-range dependence or K value of the traffic output from the scheduler on link 14 is determined by sampling the traffic at regular intervals via a measurement circuit 52.

In the arrangement of FIG. 5, the process/monitor determines a measure of autocorrelation between a small number of successive samples to provide an estimated value of the long-range dependence of the traffic. We have found that this estimate provides sufficient information in real time for traffic management purposes without the need for a complex and time consuming calculation of the Hurst parameter. We have further found that three or four successive samples are sufficient to provide a meaningful estimate that is sufficiently accurate for the purposes of communications traffic grooming.

The long-range dependence estimate is fed to a network manager device 54 which provides feedback control to the scheduler 302. This feedback continually determines the current rate at which the scheduler dispatches packets from the buffers on to the link 14. The feedback may also be used to determine the particular buffer queue from which the next packet is selected in order to provide a particular mix of outgoing traffic types that achieves a reduction in long-range dependency. For example, the scheduler may mix constant bit rate traffic with variable bit rate traffic to achieve the reduction in long-range dependence.

Figure 6:
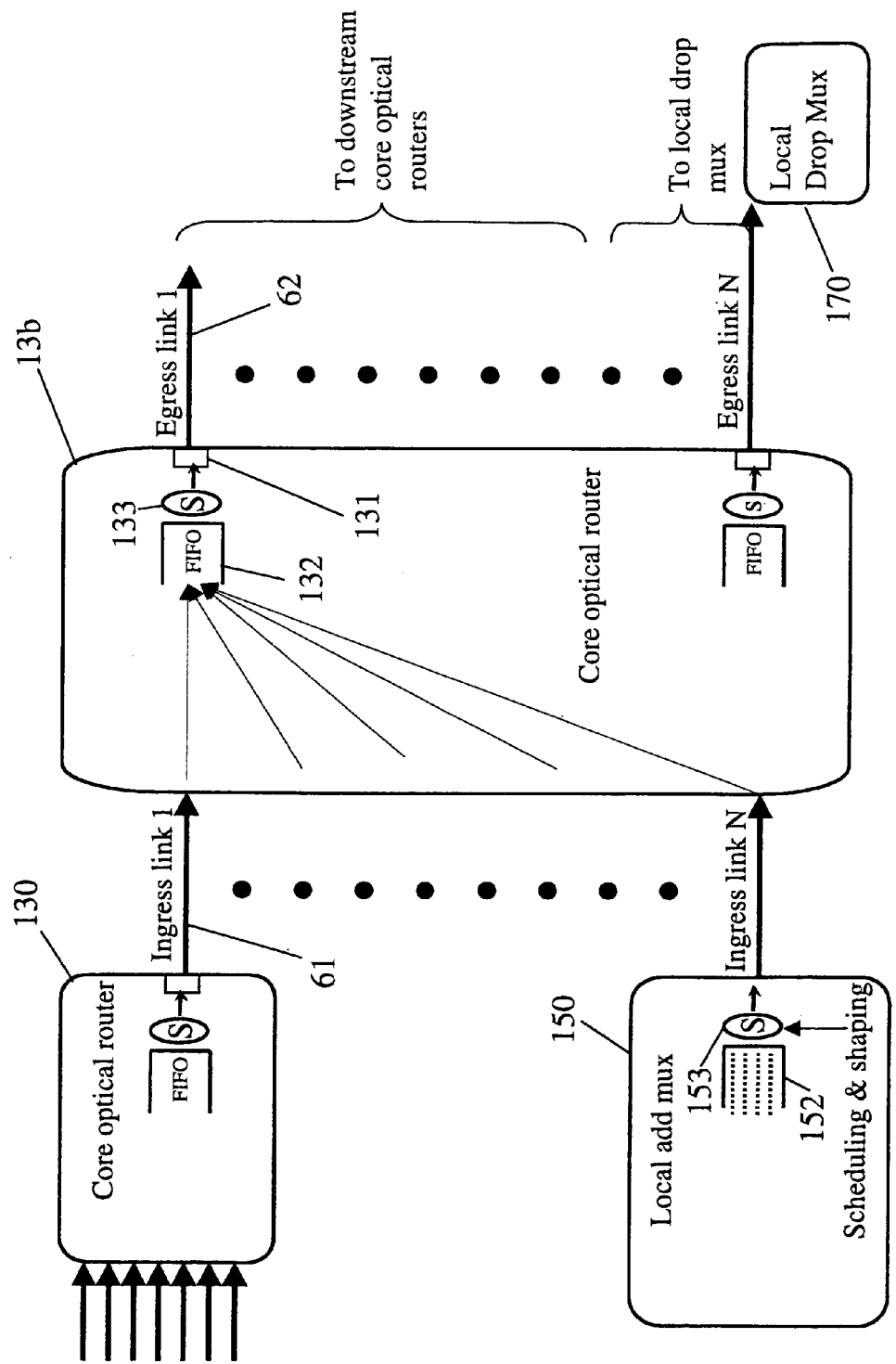
FIG. 6 illustrates a queuing process at an aggregation point in the network of FIG. 1.

FIG. 6 illustrates schematically the queuing at an aggregation point and the generation of bursty traffic. As shown in FIG. 6, a core router 13 has a plurality of ingress links 41 and a plurality of egress links 42. Some of the ingress links receive traffic from other core routers 130, while other ingress links receive traffic from one or more local add multiplexes 150. The egress links 42 couple to downstream core optical routers (not shown) or to a local drop multiplexer 170. Each egress link is associated with a respective egress port 131 provided with a FIFO buffer store 132 and a scheduler 133. Similarly, the local add multiplexer 150 has a FIFO (first-in-first-out) buffer and a traffic scheduler 153 at its output. Although traffic shaping or grooming can be applied to the aggregate traffic at the egress link of each add multiplexer, the total traffic consists of a superposition of traffic flows destined for different egress ports of the core router. In the absence of traffic shaping as described above, the traffic flows managing from multiple ingress port, of the router 13 could produce a bursty aggregate requiring significant downstream buffering.

FIGS. 7 to 10 illustrate examples of the use of the above traffic grooming techniques at various points in a network. It will be understood that the arrangements and methods described in these figures may be employed individually or in combination. It will further be understood that these examples of the use of the techniques described above are in no way to be considered as limiting.

Figure 7:
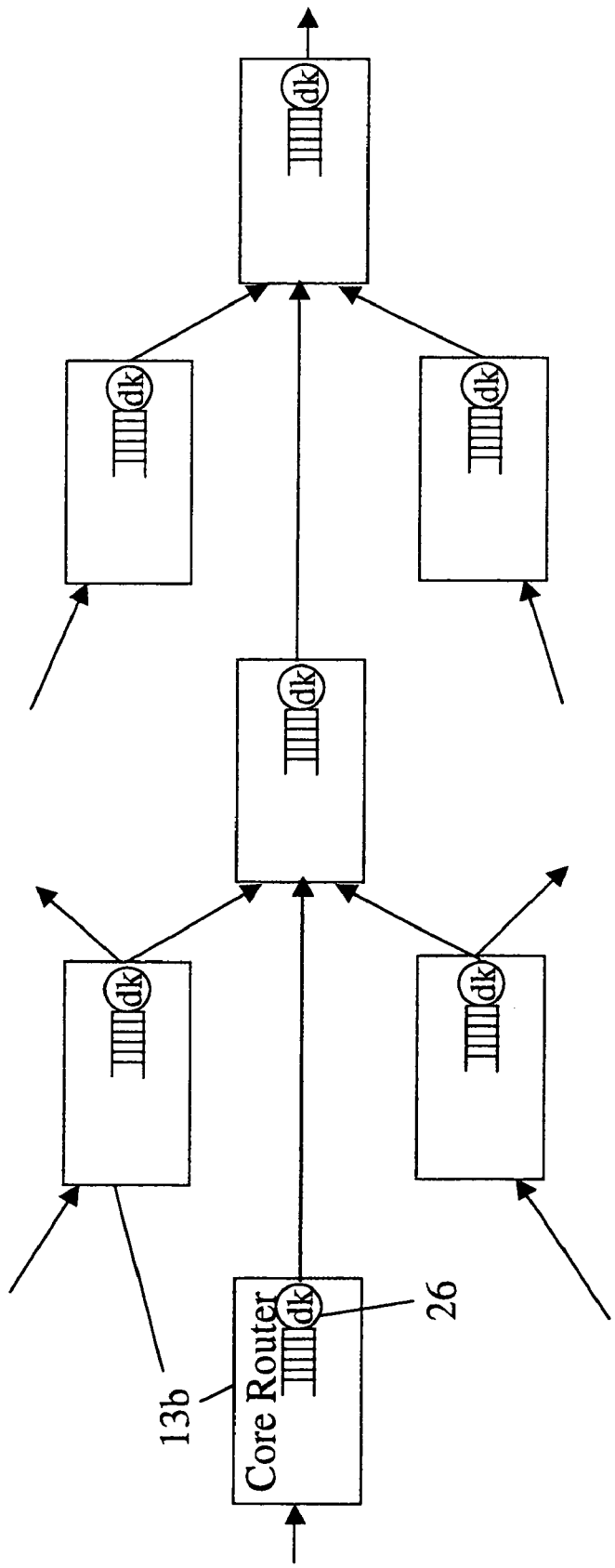
FIG. 7 illustrates traffic control within a network core.

FIG. 7 illustrates traffic control within a network core. In this arrangement, the aggregate output stream of each core router 13b is shaped or groomed by reducing its long range dependency. The arrangement may be combined with a token/leaky bucket shaper (not shown). It will be appreciated that reducing the long range dependence of traffic at the router output benefits the downstream routers rather than the router at which the traffic is groomed. This enables the downstream routers to have smaller buffering requirements and/or improved performance. Advantageously, the traffic grooming parameters are set by the network manager, based on the downstream router configuration.

Figure 8:
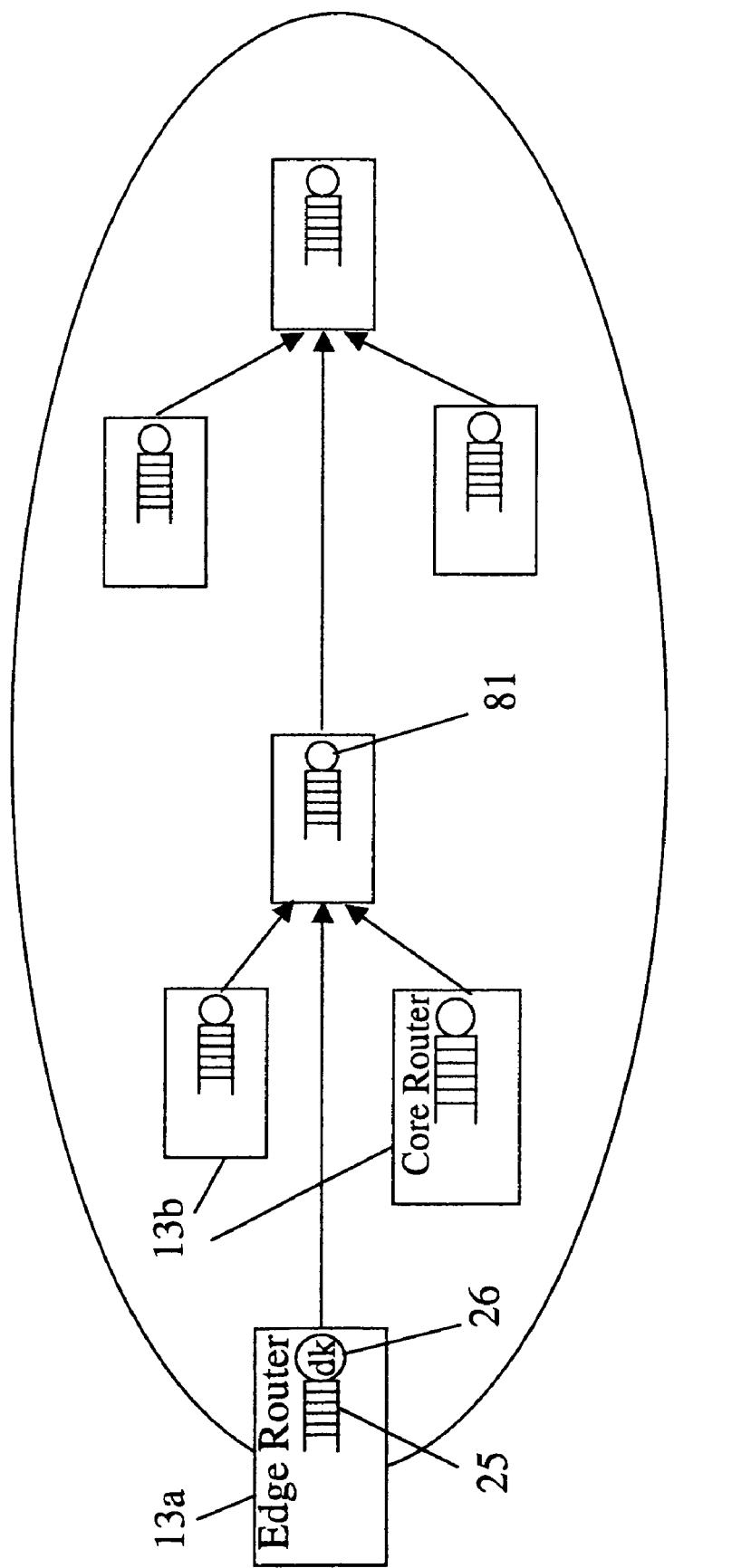
FIG. 8 illustrates traffic control at a network edge.

FIG. 8 illustrates traffic control at a network edge. In this embodiment, traffic dispatched from output buffer 25 at an edge node 13a is shaped or groomed by determination of the K parameter (26), but the core routers 13b perform simple scheduling (81) of this groomed traffic. The traffic grooming parameters are set by the network manager based on the core router configurations and the topology of the core.

Figure 9:
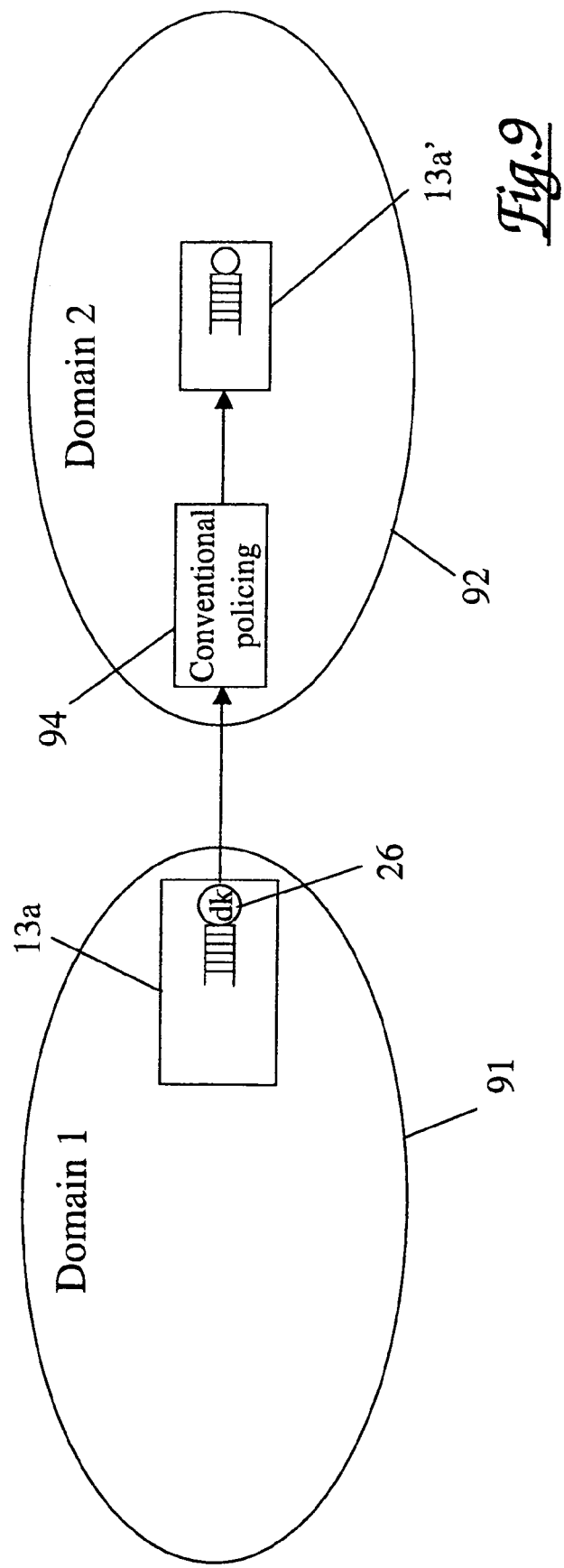
FIG. 9 illustrates traffic control at a network egress.

FIG. 9 illustrates the control or grooming of traffic egressing from an edge router 13a of a first network 91 where the traffic is forwarded to an edge router 13a' another network or domain 92. Typically, the traffic received at the second domain 92 is monitored by a policing system 94 to ensure compliance with the rules of the second domain. Traffic which forwarded to the second domain 92 is typically token-bucket shaped to fit within SLS (signalling link selection), e.g. using a so-called three-colour marking. The traffic grooming at egress from the first domain reduces drop probability while transiting to the other domain thus improving customer service levels.

Figure 10:
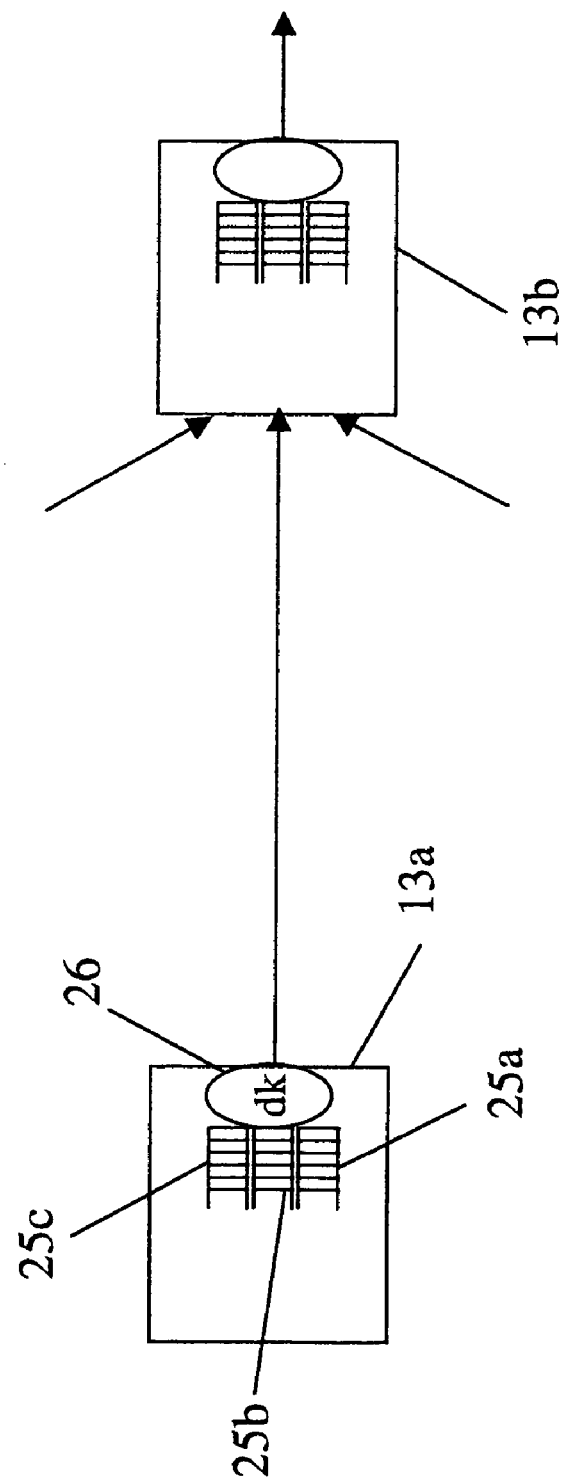
FIG. 10 shows a multiservice traffic control arrangement.

FIG. 10 shows a multi-service traffic control arrangement in which the traffic is groomed or shaped at egress from a plurality of buffers 25a to 25c at an edge router 13a to reduce the effects of long range dependence on some traffic classes at a downstream core router 13b. Each buffer 25a, 25b, 25c accommodates a respective traffic class. Packets from other traffic classes are used to fill gaps (when available). This reduces buffer requirements and improves performance of the traffic classes at downstream nodes.

It will be understood that the above description of preferred embodiments is given by way of example only and that various modifications may be made by those skilled in the art without departing from the spirit and scope of the invention.

The invention claimed is:

1. A method of grooming communications traffic output under the control of a scheduler from a switch or router so as to effect congestion control, the method comprising; sampling the output traffic to determine a bit rate at each sample, estimating from the traffic samples a statistical measure indicative of congestion and related to a long range dependence of the traffic, determining whether an increase or decrease in the scheduler dispatch rate would result in an increase or decrease in the estimated statistical measure, and adjusting the scheduler dispatch rate so as to reduce the estimated statistical measure, wherein said statistical measure is determined as a ratio of auto-correlation functions for successive sample measures.

2. A method of controlling egress of traffic from an output buffer of a communications device so as to effect congestion control, the method comprising;
sampling the traffic output from the buffer at sequential intervals to determine a bit rate at each interval;
estimating from a plurality of successive traffic samples a statistical measure indicative of congestion and related to a long range dependence of the traffic; and
increasing or decreasing the rate at which the traffic is output from the buffer so as to reduce said statistical measure and thereby reduce said congestion;
wherein said statistical measure is determined as a ratio of auto-correlation functions for successive sample measures.

3. A method as claimed in claim 2, wherein the autocorrelation function is determined over a time scale corresponding to the speed of a link over which the traffic is output from the buffer.

4. A method as claimed in claim 3, wherein the autocorrelation function is determined over a time scale of about one hundred microseconds to about one second.

5. A method as claimed in claim 4, wherein traffic is input to the communications device via a plurality of input buffers, and wherein traffic is processed from said input buffers in an order which reduces long range dependence of traffic output from the device.

6. A method as claimed in claim 5, wherein said traffic comprises Internet Protocol (IP) traffic.

7. A method as claimed in claim 6, wherein the traffic is transported on an optical transport layer.

8. A method as claimed in claim 7, wherein traffic of different classes is stored in respective output buffers, and wherein said traffic classes are mixed on egress from said router so as to reduce said long term dependence.

9. A method as claimed in claim 8, wherein traffic egressing from said router is directed to a further network.

10. A method of controlling egress of traffic from an output buffer of a communications device so as to reduce downstream congestion, the method comprising;
sampling the traffic output from the buffer at sequential intervals to determine a bit rate at each interval;
calculating from successive samples an estimated autocorrelation function for the egressing traffic;
estimating from said estimated autocorrelation function a statistical measure related to a long range dependence of the traffic;
determining whether an increase or decrease in the rate at which the traffic is output from the buffer will reduce said estimated statistical measure; and,
responsive to said determination, increasing or decreasing said output rate.

11. A method of aggregating traffic from a plurality of traffic streams in a communications packet network, the method comprising;
queuing the traffic streams in respective buffer stores;
selecting queued packets from the stores via a scheduler for dispatch on a common path;
dispatching the selected packets at a controlled rate from the scheduler on to a path so as to form an aggregate traffic stream on that path;
sampling the aggregate traffic streams and estimating from the traffic stream samples a statistical measure indicative of congestion and related to a long range dependence of the traffic over a plurality of successive samples; and
adjusting the dispatch rate of the scheduler so as to reduce the estimated statistical measure to a minimum value;
wherein said statistical measure is determined as a ratio of auto-correlation functions for successive sample measures.

12. A method of controlling the egress rate of traffic from an output buffer in a communications network so as to effect congestion control downstream of the buffer, the method comprising; sampling the egressing traffic at sequential intervals to determine a bit rate at each interval, estimating from the traffic intervals a statistical measure indicative of congestion and related to a long range dependence of the egressing traffic, determining whether an increase or decrease in the buffer output rate would result in an increase or decrease in the estimated statistical measure, and adjusting the buffer output rate so as to effect a decrease in the estimated statistical measure, wherein said statistical measure is determined as a ratio of auto-correlation functions for successive interval measures.

13. A communications network router having means for controlling egress of traffic from an output buffer, the router comprising;
- sampling means for sampling the traffic output from the buffer to determine a bit rate at end sample;
- means for estimating from a plurality of successive traffic samples a statistical measure indicative of congestion and related to a long range dependence of the traffic; and
- control means for increasing or decreasing the rate at which the traffic is output from the buffer so as to reduce said statistical measure and thereby reduce said congestion;
- wherein said means for estimating is arranged to determine said statistical measure as a ratio of auto-correlation functions for successive sample measures.

14. A communications network comprising a plurality of routers interconnected by communications links, each said router having scheduler means for controlling the rate at which traffic is output from the switch or router, and wherein at least some of said routers are provided with sampling means for sampling the output traffic from that router to determine a bit rate at each sample, estimating means for determining from the traffic samples a statistical measure indicative of congestion and related to a long range dependence of the traffic, and means for adjusting the scheduler dispatch rate so as to minimise the statistical measure and thereby reduce said congestion, wherein said estimating means is arranged to determine said statistical measure as a ratio of auto-correlation functions for successive sample measures.

15. A communications network as claimed in claim 14, and comprising an edge network providing access to a core network.

16. A communications network as claimed in claim 15, wherein said core network is an optical network.

17. A communications network comprising; a first set of routers constituting an edge network, and a second plurality of routers constituting a core network, wherein each edge network router has scheduler means for controlling the rate at which traffic is output from the switch or router, and wherein each said router is provided with sampling means for sampling the output traffic from that router at sequential intervals to determine a bit rate at each interval, estimating means for determining from the traffic samples a statistical measure indicative of congestion and related to a long range dependence of the traffic, and means for adjusting the scheduler dispatch rate so as to minimise the estimated statistical measure and thereby reduce downstream congestion of traffic output from that edge router to another edge router or to a core router, wherein said estimating means is arranged to determine said statistical measure as a ratio of auto-correlation functions for successive sample measures.

18. A communications network as claimed in claim 17, and comprising a multi-layer structure provided with an underlying optical transport layer.

19. A communications network as claimed in claim 18, wherein said edge routers and core routers together constitute an Internet Protocol (IP) layer.

20. Software in computer readable form on a computer storage medium and arranged to perform a method of grooming communications traffic output under the control of a scheduler from a switch or router so as to effect congestion control, the method comprising; sampling the output traffic to determine a bit rate at each sample, estimating from the traffic samples a statistical measure indicative of congestion and related to a long range dependence of the traffic, determining whether an increase or decrease in the scheduler dispatch rate would result in an increase or decrease in the estimated statistical measure, and adjusting the scheduler dispatch rate so a to reduce the estimated statistical measure, wherein said statistical measure is determined as a ratio of auto-correlation functions for successive sample measures.

21. A network manager incorporating software as claimed in claim 20.

22. A method of determining in a communications network a statistical measure indicative of congestion and related to a long range dependency of a communication packet stream, the method comprising sampling the packet stream, and estimating from the traffic stream samples a normalised measure of the auto correlation of the traffic stream over a plurality of successive samples, and determining a value for the statistical measure on the basis of the estimated measures of the autocorrelation of the traffic stream, wherein said statistical measure is determined as a ratio of auto-correlation measures estimated over first and second time periods.

* * * * *